United States Patent [19]

Naito et al.

[11] 4,423,470

[45] Dec. 27, 1983

[54] LENS BARREL SUITABLE FOR FLASH PHOTOGRAPHY

[75] Inventors: Hideshi Naito, Tokyo; Hideyo Nozawa, Ohmiya; Kazuyuki Kazami, Tokyo, all of Japan

[73] Assignee: Nippon Kogaku K. K., Japan

[21] Appl. No.: 296,323

[22] Filed: Aug. 26, 1981

[30] Foreign Application Priority Data

Aug. 29, 1980 [JP] Japan ............................ 55/121798[U]

[51] Int. Cl.³ .............................................. G03B 15/02
[52] U.S. Cl. ......................................... 362/17; 362/11; 362/18; 362/232; 362/241; 362/249; 362/277; 354/126; 354/132
[58] Field of Search ................... 354/126, 132; 362/18, 362/17, 11, 232, 241, 249, 277

[56] References Cited

U.S. PATENT DOCUMENTS

| | | | |
|---|---|---|---|
| 4,190,880 | 2/1980 | Esaki | 362/18 |
| 4,276,579 | 6/1981 | Yako | 362/18 |
| 4,293,892 | 10/1981 | Plummer | 362/18 |
| 4,392,183 | 7/1983 | Östlund et al. | 362/17 |

*Primary Examiner*—Stephen J. Lechert, Jr.
*Attorney, Agent, or Firm*—Shapiro and Shapiro

[57] ABSTRACT

In a lens barrel to which a flashlight-emitting device is mounted or may be mounted and which enables a very proximate object to be photographed, there is provided a light-intercepting member interposed in the path of the light emitted by the flashlight-emitting device in response to the operation of a lens optical system for rendering the lens barrel capable of effecting very proximate photography, the light-intercepting member being for intercepting part of the light emitted from the flashlight-emitting device and travelling toward the optical axis of the lens optical system.

5 Claims, 7 Drawing Figures

LENS BARREL SUITABLE FOR FLASH PHOTOGRAPHY

BACKGROUND OF THE INVENTION

1. Field of the Invention

This invention relates to a lens barrel, and more particularly to a lens barrel suitable for use with a flashlight-emitting device to effect very proximate flash photography.

2. Description of the Prior Art

When auxiliary light photography has been effected with an object illuminated by an electronic flashlight-emitting device, the aperture value has been made variable to make the total quantity of light emitted by the flashlight-emitting device and the product of the object distance and the aperture value equal to each other. However, in very proximate photography, the object distance is very short and therefore, to obtain proper exposure, it has often been the case that a diaphragm opening smaller than the minimum diaphragm opening that can be adjusted by the diaphragm device of a camera is required. Thus, U.S. Pat. No. 4,034,387 or U.S. Pat. No. 4,068,245 discloses a technique in which the quantity of emitted flashlight is made variable with the object distance and the photographing magnification taken into account, whereby the object lying at a very proximate position is properly illuminated.

However, the conventional technique of this type has the following disadvantage although it has certainly increased the possibility of obtaining proper exposure during very proximate photography. That is, since there is a limit in the minimum value of the quantity of emitted light electrically adjusted, the conventional flashlight-emitting device becomes useless for an object for which proper exposure can be obtained only at a quantity of emitted light smaller than this minimum value.

SUMMARY OF THE INVENTION

It is an object of the present invention to provide a lens barrel provided with a light-intercepting member for intercepting part of the emitted light from a flashlight-emitting device.

According to the present invention, even in a case where during very proximate photography, proper exposure cannot be obtained unless the aperture is stopped down to a diaphragm aperture smaller than the minimum diaphragm aperture adjustable by a diaphragm device, the light-intercepting member intercepts part of flashlight and therefore, proper exposure can be obtained even if the aperture is the minimum diaphragm aperture. Also, since the quantity of emitted light for illuminating an object is controlled by the light-intercepting member, proper exposure can be provided even for an object for which proper exposure can be obtained only at the quantity of emitted light smaller than said minimum value.

The invention will become more fully apparent from the following detailed description thereof taken in conjunction with the accompanying drawings.

DESCRIPTION OF THE PREFERRED EMBODIMENTS

Figure 1:
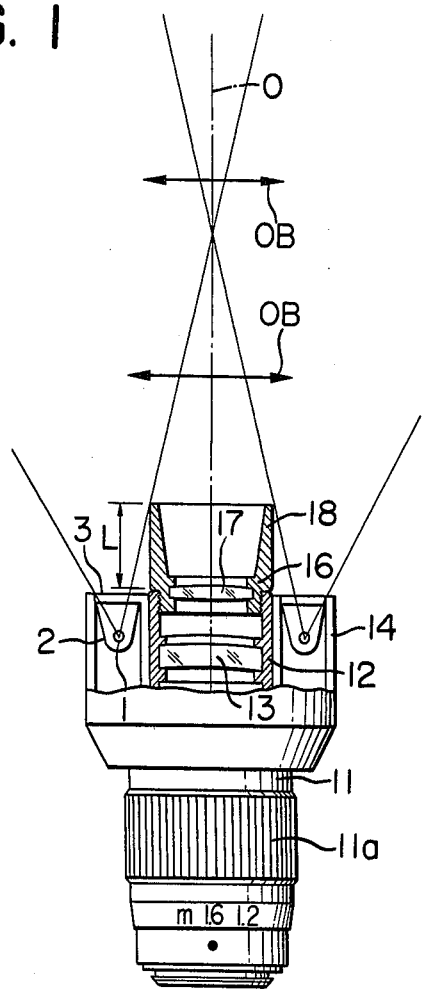
FIG. 1 is a partly cross-sectional view showing a first embodiment of the present invention.

FIG. 1 is a partly cross-sectional view showing a first embodiment of the present inventin. A lens barrel 11 adopts a flashmatic system, namely, a system of controlling the diaphragm aperture so that the aperture control device satisfies the following relation in accordance with the object distance adjustment by a focusing ring 11a. $GN = F.D.\sqrt{Sx/Sa}$, where GN represents a predetermined guide number of a flashlight emitting device, F represents the aperture value, D represents the object distance, Sa represents the standard film speed (ASA=100), and Sx represents the speed of the film used. In the case of very proximate photography, a close-up lens is mounted on the lens body.

Now, the lens barrel 11 is of the type in which an unshown part of the interior of the lens system is moved during focusing (the so-called inner focusing type) and a fixed lens 13 is mounted in the lens frame 12 thereof. A flashlight discharge tube 1, a reflecting mirror 2 and a diffusion mirror 3 are disposed in a flash device containing frame 14. The containing frame 14 is fixed to or removably mounted on the lens barrel 11.

A cylindrically-shaped close-up lens holding frame 16 is threadably fitted in the opening of the lens frame 12. This holding frame holds a close-up lens 17 and is provided with a projected hood portion 18. When the close-up lens is mounted, a diaphragm device fixes the stop aperture to a predetermined aperture value (for example, the maximum aperture value) in response thereto.

Figure 2:
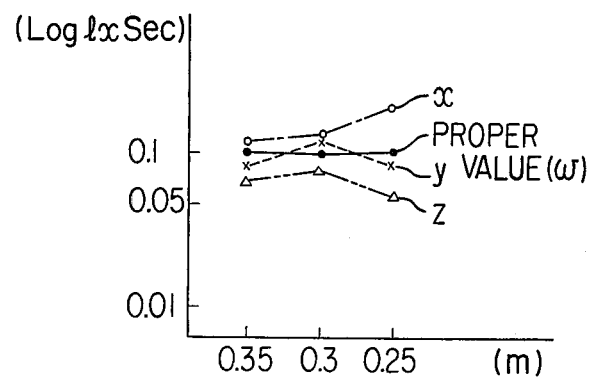
FIG. 2 is a graph illustrating the relation between the object distance and the exposure amount.

Assume that when the close-up lens 17 has been mounted, the photographing distance is varied from 0.35 to 0.25 mm by focusing. FIG. 2 shows the variation in exposure amount at ASA 100 when the length L of the hood portion 18 has been varied in three ways with the quantity of emitted light and the aperture value maintained constant.

In FIG. 2, straight line w represents a proper exposure amount and crooked lines x, y and z represent the exposure amounts when the length L of the hood portion 18 is short, medium and long. As can be seen, if the dimension L is too short, exposure is generally over and such tendency is particularly remarkable on the short distance side (crooked line x) and conversely, if the dimension L is too long, exposure is generally under and such tendency is particularly remarkable on the short distance side (crooked line z). By experiment, the dimension L may be determined so that the variation in exposure amount becomes approximate to the straight line w (for example, becomes the crooked line y). The exposure amount is decreased by the hood portion 18 while the photographying magnification is improved by the close-up lens 17 and therefore, very proximate photography becomes possible without varying the aperture value.

Figure 3:
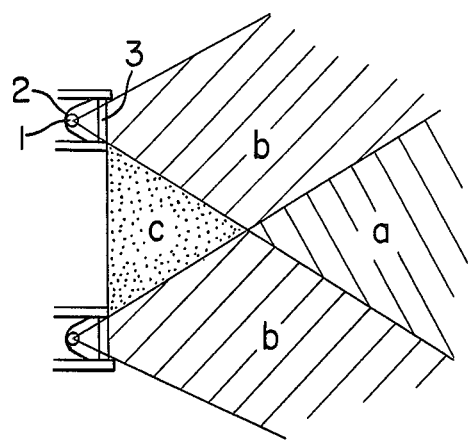
FIGS. 3 and 4 illustrate the light-intercepting characteristic according to the present invention.

The function of the hood portion 18 will now be described in detail. First, consider a case where the hood portion 18 is not provided. As shown in FIG. 3, for example, the flashlight emitted from the ring-like flashlight discharge tube 1 is reflected by the reflecting mirror 2 and diffused by the diffusion mirror 3. As a result, there are created three areas a, b and c. When the object to be photographed lies in the area a, the object is sufficiently illuminated by the flashlight, but when the object lies in the area b, the degree of illumination becomes about one half and when the object lies in the area c, it is little illuminated. Actually, however, the boundaries between the areas a to c are not so clear under the influence of the reflecting mirror 2 and diffusion mirror 3, but there occurs the tendency that as the object comes nearer to the lens beyond a predetermined distance, the quantity of light illuminating the object becomes decreased.

Figure 4:
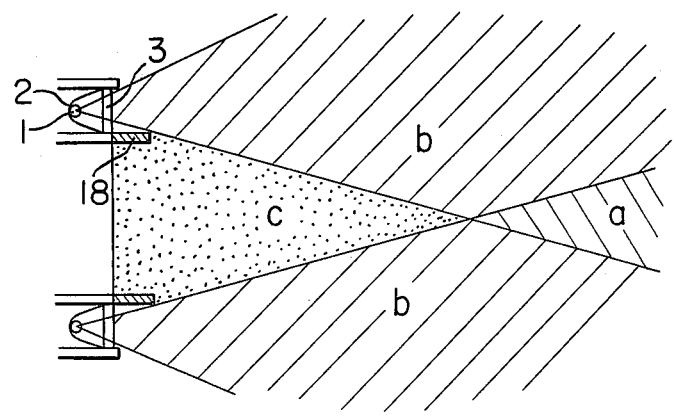

Therefore, as shown in FIG. 4, a cylindrically-shaped hood portion 18 is provided inside of the ring-like flashlight discharge tube 1 and interposed in the path of the emitted light. Again in this case, the light emission forms three areas a to c shown in FIG. 3, but the flashlight travelling toward the optical axis 0 of the lens is intercepted by the hood portion 18 and therefore, the portions occupied by the areas b and c become large and thus, the range of the photographing distance of the lens falls within the areas b and c. Accordingly, in the case of the lens of the flashmatic type, it is possible to improve the photographing magnification during very proximate photography while the aperture value remains constant.

The above-described light-intercepting device can also be adopted during very proximate flash photography using an automatic flash output control type flash device. That is, there are two types of automatic flash output control type flash device, namely, the TTL flash output control type (U.S. Pat. No. 3,726,197) which is known per se and the extraneous flash output control type, and in any of these types, the quantity of emitted flashlight is very small because, in the case of very proximate photography, the object to be photographed comes close to the flashlight-emitting portion and the light-receiving portion of the flash device.

In the case of the TTL flash output control type, if the amount of projection of the hood is set to such a degree that over exposure does not occur even for a minimum quantity of emitted flashlight, proper exposure may be obtained independently of the object distance (a very near distance) and the aperture value. In the case of the extraneous flash output control type, if the aperture value is set to a predetermined value (at the time of usual flash photography, the aperture value of the lens is set in accordance with the aperture value selected on the flash device side so that proper exposure may be obtained by contriving conformity between the aperture value of the diaphragm provided in front of the light-receiving portion of the flash device and the aperture value of the lens) and the amount of projection of the hood is set to the same degree as that in the case of the TTL flash output control type, then proper exposure may be obtained independently of the object distance. In any of these flash output control types, the quantity of emitted light need not be made constant.

Also, in the case of the TTL flash output control type, the flashlight-emitting portion is disposed at the position shown in FIG. 1 and the light-receiving portion is disposed so as to receive the reflected light from the film in the camera. In the case of the extraneous flash output control type, the flashlight-emitting portion is preferably disposed at the position shown in FIG. 3 and the light-receiving portion is preferably disposed near the light-emitting portion so as to be capable of receiving the reflected light from the object.

Figure 5:
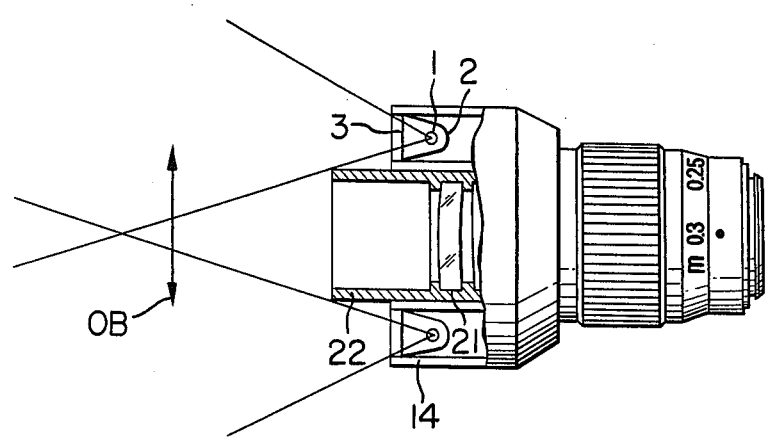
FIG. 5 is a partly cross-sectional view showing a second embodiment of the present invention.

FIG. 5 shows another embodiment. In this embodiment, no close-up lens is provided and very proximate flash photography becomes possible by moving the lens, etc.

A hood portion 22 is formed by causing one end of a lens holding member 21 to be projected, whereby the amount of rotation of the focus ring and the amount of movement of the hood by focusing during very proximate photography are substantially proportional to each other and the light-emission characteristic shifts between the condition shown in FIG. 3 and the condition shown in FIG. 4.

Figure 6:
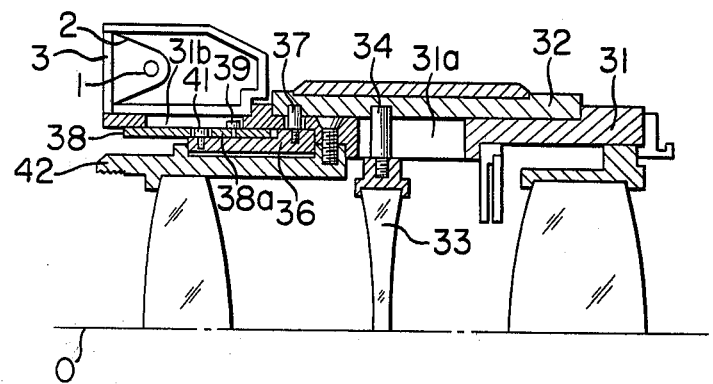
FIG. 6 is a cross-sectional view showing a third embodiment of the present invention.

FIG. 6 shows still another embodiment.

Figure 7:
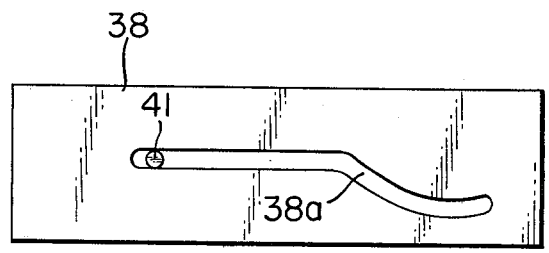
FIG. 7 illustrates a part of FIG. 6.

A fixed cylinder 31 has an axial cut-away 31a formed in the intermediate portion thereof and also has an axial cut-away 31b formed at the fore end (the left end as viewed in FIG. 6) thereof. A focus ring 32 fitted in the fixed cylinder 31 is connected to a lens 33 by a pin 34 and connected to a ring 36 by a pin 37. A pin 39 studded in a hood 38 interposed between the fixed cylinder 31 and the ring 36 is engaged with the cut-away 31b, and a pin 41 studded in the ring 36 is engaged with a cam groove 38a in the hood 38. A developed view of the cam groove 38a is shown in FIG. 7. A lens holding frame 42 is further fixed to the fixed cylinder 31. The straight portion of the cam groove 38a acts during normal photography (for example, when the object distance is 0.35 m to ∞), and the curved portion of the cam groove 38a acts during very proximate photography (when the object distance is 0.35–0.25 m).

When the ring 32 is rotated during normal photography, the lens 33 is moved to effect focusing. At this time, however, the pin 41 is positioned at the straight portion of the cam groove 38 and therefore, the hood 38 does not operate.

Next, when the ring 32 is further rotated for very proximate photography, the pin 41 of the ring 36 is rotated through the agency of the pin 37 and the hood 38 is moved by the engagement between the pin 41 and the cam groove 38a. At this time, the diaphragm aperture is fixed at a predetermined value by the diaphragm device. In this case, although the degree differs depending on the shape of the cam groove 38a, the amount of rotation of the focus ring 32 and the amount of movement of the hood 38 can be selected such that the variation in exposure amount becomes more approximate to the aforementioned straight line w (FIG. 2).

In the present invention, the flashlight-emitting portion of the flash device need not be ring-shaped, but a plurality of flashlight-emitting portions may be disposed around the lens. Also, if the flashlight-emitting portion of the flash device is mountable and dismountable with respect to the lens, the hood 18 may be provided on the flashlight-emitting portion. Further, the hood need not have a transmission factor of zero to light, but may be formed of a light-decreasing substance and the light-intercepting member mentioned herein includes this.

We claim:

1. In an apparatus including, in combination, a lens barrel having photographic lens means and a stop, and flashlight-emitting means which is mounted at an outer peripheral portion of said lens barrel and produces flashlight for illuminating a subject to be photographed, the improvement for very proximate photography in which the subject is positioned at a short film-to-subject distance and is illuminated by said flashlight to effect phototaking via said lens barrel, comprising:

light-intercepting means for intercepting a part of the flashlight emitted from said flashlight-emitting means and directed to the optical axis of said lens means, the light-intercepting means being positioned so as to enlarge an area that provides little illumination by said flashlight of said subject to be photographed, the area being defined by both said lens barrel and the illumination pattern of said flashlight; said light-intercepting means being interposed in the path of the flashlight so that it is effective during said very proximate photography.

2. The improvement according to claim 1, wherein said lens barrel has mounted thereon a close-up lens used in said very proximate photography, and said light-intercepting means is fixed to said close-up lens so that it is interposed in said path of the flashlight when the close-up lens is mounted on said lens barrel.

3. The improvement according to claim 1, wherein said lens barrel is further provided with focusing means capable of focusing relative to the film-to-subject distance at said very proximate photography and relative to film-to-subject distance at normal photography in which the film-to-subject distance is longer than said film-to-subject distance at very proximate photography, and wherein said light-intercepting means is constructed to advance in said path of the flashlight when focusing is effected at said very proximate photography and to retract from the path of said flashlight when focusing is effected at said normal photography.

4. The improvement according to claim 3, wherein cam means is provided between said focusing means and said light-intercepting means, and said cam means causes the amount of the advance of said light-intercepting means in the path of said flashlight to be adjustable in response to the displacement of said focusing means at said very proximate photography, so that the area that provides little illumination may be changed depending upon the film-to-subject distance.

5. The improvement according to claim 1, wherein said stop is set at a predetermined aperture appropriate to said very proximate photography.

* * * * *